US010277695B1

(12) United States Patent
Hassibi et al.

(10) Patent No.: US 10,277,695 B1
(45) Date of Patent: Apr. 30, 2019

(54) IDENTIFICATION OF USER-INTENDED BROWSING BEHAVIOR

(71) Applicant: CSC Holdings, LLC, Bethpage, NY (US)

(72) Inventors: Khosrow Hassibi, Danville, CA (US); Saigopal Thota, Fremont, CA (US); Eunsil Baik, South San Francisco, CA (US)

(73) Assignee: CSC Holdings, LLC, Bethpage, NY (US)

( * ) Notice: Subject to any disclaimer, the term of this patent is extended or adjusted under 35 U.S.C. 154(b) by 122 days.

(21) Appl. No.: 15/258,087

(22) Filed: Sep. 7, 2016

(51) Int. Cl.
*H04L 1/00* (2006.01)
*H04L 29/08* (2006.01)
*H04L 29/06* (2006.01)

(52) U.S. Cl.
CPC .............. *H04L 67/22* (2013.01); *H04L 69/22* (2013.01)

(58) Field of Classification Search
CPC ................................ H04L 67/22; H04L 69/22
USPC ........................................................ 370/253
See application file for complete search history.

(56) References Cited

U.S. PATENT DOCUMENTS

| 2012/0059911 A1* | 3/2012 | Randhawa ............ G06F 19/321 |
| | | 709/219 |
| 2016/0080461 A1* | 3/2016 | Pradeep .................. H04L 67/02 |
| | | 709/219 |
| 2017/0026483 A1* | 1/2017 | Ruellan ............... H04L 67/2842 |

* cited by examiner

*Primary Examiner* — Sai Ming Chan
(74) *Attorney, Agent, or Firm* — Sterne, Kessler, Goldstein & Fox P.L.L.C.

(57) ABSTRACT

Resource processor circuitry parses responses corresponding to a resource of a request from other responses corresponding to other resources embedded in the resource of the request. This parsing reduces the shear amount of data needed to be processed by the resource processor circuitry, thereby improving performance of the resource processor circuitry. The resource processor circuitry parsing uses a pattern matching routine to parse the response corresponding to the resource of the request from the responses corresponding to other resources embedded in the resource of the request. Thereafter, the resource processor circuitry includes the response corresponding to the resource of the request to a catalog.

20 Claims, 4 Drawing Sheets

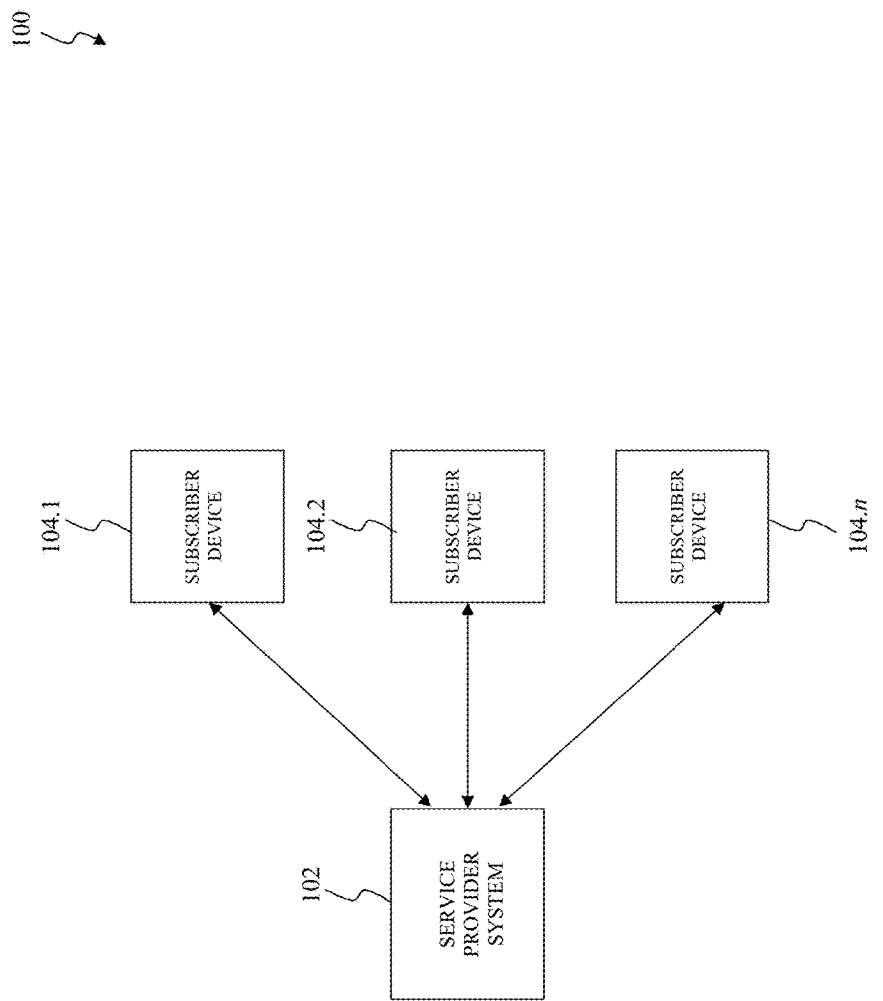

US 10,277,695 B1

IDENTIFICATION OF USER-INTENDED BROWSING BEHAVIOR

BACKGROUND

Advertising is a form of marketing communication used for promoting or selling a product or service. The purpose of advertising is to convince customers that a company's services or products are the best, enhance the image of the company, point out and create a need for products or services, demonstrate new uses for established products, announce new products and programs, reinforce the company messages, draw customers to the company, and to retain existing customers. Contextual advertising represents a form of targeted advertising for advertisements appearing on webpages or other media, such as content displayed in software applications for retrieving, presenting, and traversing information resources on the World Wide Web, often referred to as web browsers. It can be beneficial to use browsing habits and other data collected from customers, such as traditional television viewership data to provide an example, to make the advertising more effective.

BRIEF DESCRIPTION OF THE DRAWINGS/FIGURES

The present disclosure is described with reference to the accompanying drawings. In the drawings, like reference numbers indicate identical or functionally similar elements. Additionally, the left most digit(s) of a reference number identifies the drawing in which the reference number first appears. In the accompanying drawings:

FIG. 1A illustrates a block diagram of an exemplary point-to-multipoint communication system according to an embodiment of the present disclosure;

Figure 2:
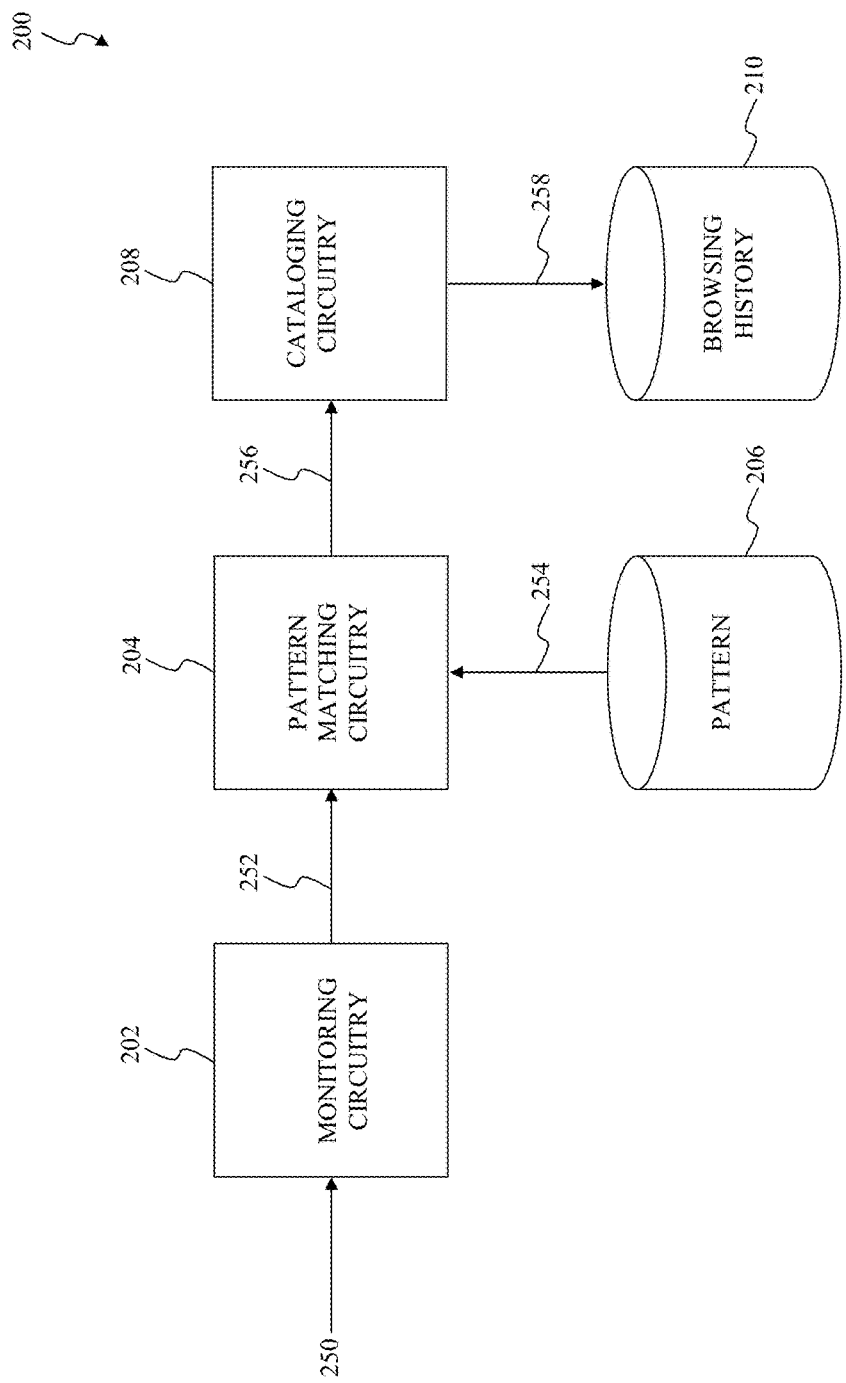
Figure 3:
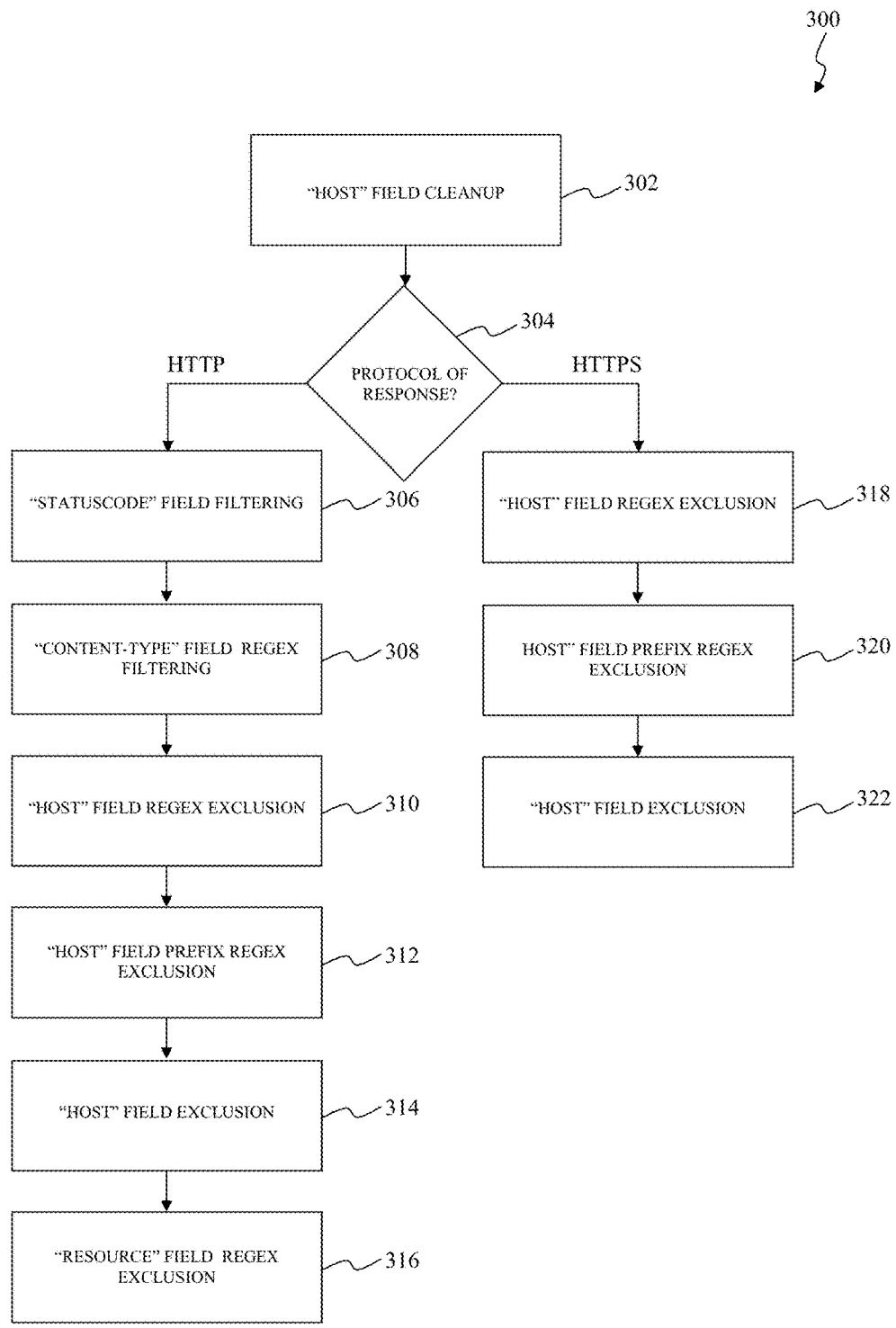

FIG. 2 illustrates a block diagram of exemplary resource processor circuitry within a cable modem termination system of the point-to-multipoint communication system according to an embodiment of the present disclosure; and FIG. 3 is a flowchart of exemplary operational steps of the pattern matching routine that can be used by the exemplary resource processor circuitry according to an embodiment of the present disclosure.

The present disclosure will now be described with reference to the accompanying drawings.

DETAILED DESCRIPTION OF THE DISCLOSURE

Overview

Resource processor circuitry parses responses corresponding to a resource of a request from other responses corresponding to other resources embedded in the resource of the request. This parsing reduces the shear amount of data needed to be processed by the resource processor circuitry, thereby improving performance of the resource processor circuitry. The resource processor circuitry parsing uses a pattern matching routine to parse the response corresponding to the resource of the request from the responses corresponding to other resources embedded in the resource of the request. Thereafter, the resource processor circuitry includes the response corresponding to the resource of the request to a catalog.

Exemplary Point-to-Multipoint Communication System

FIG. 1A illustrates a block diagram of an exemplary point-to-multipoint communication system according to an embodiment of the present disclosure. A communications system 100 includes a service provider system 102 to provide a service, such bi-directional communication of video, audio, and/or data to provide some examples, to subscriber devices 104.1 through 104.n. Each of the subscriber devices 104.1 through 104.n represent one or more personal computers, data terminal equipment, one or more telephony devices, such as one or more mobile phones or one or more mobile computing devices to provide some examples, one or more broadband media players, one or more network controlled appliances, one or more set-top boxes, and/or other devices that are capable of transmitting and/or receiving video, audio, and/or data that will be apparent to those skilled in the relevant art(s). As used herein, the term "downstream direction" refers to the transfer of information in a first direction from the service provider system 102 to the subscriber devices 104.1 through 104.n. The term "upstream direction" refers to the transfer of information in a second direction from the subscriber devices 104.1 through 104.n to the service provider system 102. The discussion to follow describes a general operation of the communication system 100 in requesting and delivery of a webpage over a network, such as the World Wide Web (WWW) to provide an example. However, those skilled in the relevant art(s) will recognize that the communication system 100 can perform other functions without departing from the spirit and scope of the present disclosure.

The service provider system 102 manages the upstream direction and the downstream direction transfer of information to and/or from the subscriber devices 104.1 through 104.n. During operation in the upstream direction, one or more of the subscriber devices 104.1 through 104.n provide a request to access a resource, such as a webpage to provide an example, to the service provider system 102. In an exemplary embodiment, the one or more of the subscriber devices 104.1 through 104.n execute a software application, such as a web browser to provide an example, to provide the request. The request indicates a desired action, such as "GET," "HEAD", "POST," "PUT," "DELETE", "TRACE," "OPTIONS," "CONNECT," or "PATCH" to provide some examples to be performed on the resource. In this exemplary embodiment, a string of characters, such as a Uniform Resource Identifier (URI) to provide an example, is entered into the software application to identify the resource. The URI can include a Uniform Resource Locator (URL) and/or Uniform Resource Name (URN). For example, the string of characters can be entered into the software application using a peripheral device, such as a keyboard to provide an example. Typically, the URL represents a sequence of alphanumeric characters, such as http://hostname/filename.html to provide an example. In this example, a first part of the URL, namely, "http," identifies a protocol to be used by the communication system 100 to access the resource, a second part of the URL, namely "hostname," identifies a location of the resource, and the third part of the URL, namely, "filename.html," identifies a name of the resource to be accessed. Alternatively, in this example, the second part of the URL, namely "hostname," captures the full name of the location of the resource. For example, the second part of the URL can include a top level domain, such as ".com" to provide an example, a domain name, such as a website name to provide an example, and/or a prefix or sub-domain that can be one or more words or phrases separated by a dot (".") before the domain name.

In another exemplary embodiment, a software application, such as a mobile application software to provide an example, executing on the subscriber devices 104.1 through 104.n can generate the string of characters, such as the URI, to identify the resource on behalf of the subscriber devices 104.1 through 104.n. For example, a hypertext link within the software application can be activated, typically by a mouse click, which causes the software application to generate the string of characters on behalf of the subscriber devices 104.1 through 104.n. Herein, the URLs entered into the software application executing on the subscriber devices 104.1 through 104.n are referred to as User-Intended URLs and the URLs generated by the software application on behalf of the subscriber devices 104.1 through 104.n are referred to as User-Initiated URLs. Collectively, the User-Intended URLs and the User-Initiated URLs are referred to as User-Intended/Initiated URLs (UIURLs).

Often times, the web browser and/or the mobile application software store histories of the UIURLs, referred to as web browsing histories, which have been entered into the software application and/or generated by the software application. The browsing histories refer to listings of resources that been visited and/or data associated with the resources, such as titles of the resources and time of visit to the resources to provide some examples. The browsing histories, as well as other data collected from the subscriber devices 104.1 through 104.n, can be valuable to advertisers to make their contextual advertising more effective. For example, if the browsing histories indicates that resources related to monster trucks were frequently visited, this information could be used by the advertisers to present advertisements related to monster trucks across unrelated resources, such as retail resources to provide an example.

Referring back to FIG. 1A, the subscriber devices 104.1 through 104.n provide the request to the service provider system 102. Thereafter, the service provider system 102 passes the request onto a location of the resource (not shown in FIG. 1A), such as a host or a server to provide some examples, in the upstream direction. In an exemplary embodiment, the service provider system 102 uses the protocol identified by the first part of the URL to pass the request to the location. Often times, the protocol identified by the first part of the URL represents a Hypertext Transfer Protocol (HTTP) or a Hypertext Transfer Protocol Secure (HTTPs) representing a combination of the HTTP with a Secure Socket Layer (SSL)/Transport Layer Security (TLS) protocol. However, those skilled in the relevant art(s) will recognize that the first part of the URL can identify any other well-known protocol without departing from the spirit and scope of the present disclosure.

In response to the request, the service provider system 102 receives one or more responses from the location of the resource in the downstream direction. The one or more responses include a status line indicating a status code and/or a reason message, one or more response header fields, and an optional message body. Ideally, the location of the resource provides a single response corresponding to the resource of the request. In an exemplary embodiment, the status line includes a "statuscode" field indicating a status of the request and the one or more response header fields can include a "host" field identifying the location of the resource, a "content-type" field indicating a format of the resource, and/or a "resource" field indicating the specific location of the resource within the location itself.

However, in practice, the resource can be embedded with other resources corresponding to one or more objects, such as one or more images, audio, and/or video to provide some examples, embedded within the resource of the request. For example, the other resources can include other URLs, referred to as noise-URLs or background-URLs, corresponding to other resources embedded within the resource of the request. These noise URLs can be generated by embedded objects within the resource, such as logos of other resources, JavaScripts, and/or Cascading Style Sheets (CSS) scripts to provide some examples, which are loaded as part of retrieving the resource. These noise URLs can include a variety of resources, such as advertising resources, content hosting resources, content delivery networks (CDN), and/or configuration resources to provide some examples. As such, the service provider system 102 often receives multiple responses from the location of the resource in the downstream direction. These multiple responses can include one response corresponding to the resource of the request and other responses corresponding to the other resources embedded in the resource of the request.

The service provider system 102 can monitor the one or more responses to determine information about the resource. In an exemplary embodiment, this monitoring is performed using a parallel processing path within the service provider system 102. Ideally, the service provider system 102 can monitor the multiple responses to approximate browsing histories of the subscriber devices 104.1 through 104.n. In practice, however, the shear amount these responses can overwhelm the service provider system 102. For example, one household, having one or more user devices from among the subscriber devices 104.1 through 104.n to provide an example, generates an approximate average of 10 responses per minute. Daily, this one household generates an approximate average of $15 \times 10^3$ responses. This amounts to an approximate average of $5.4 \times 10^6$ responses per year for this one household. If this one household, were expanded to $3 \times 10^6$ households, which is typical for a subscriber service, than these $3 \times 10^7$ households generate an approximate average of $30 \times 10^6$ responses per minute which amount to approximately $16 \times 10^{12}$ responses per year. Considering that each response often includes the multiple responses, the shear amount of responses needed to be processed to approximate browsing histories of the $3 \times 10^6$ households can overwhelm the service provider system 102. Fortunately, the service provider system 102 can parse the response corresponding to the resource of the request from other responses corresponding to other resources embedded in the resource of the request. From the exemplary embodiment above, this parsing is performed using the parallel processing path within the service provider system 102 allowing the service provider system 102 to provide the one or more responses received from the location to the subscriber devices 104.1 through 104.n without any parsing. This parsing reduces the shear amount of data needed to be processed by the service provider system 102, thereby improving performance of the service provider system 102. Thereafter, the service provider system 102 can catalog the response corresponding to the resource of the request to approximate the browsing histories of the subscriber devices 104.1 through 104.n while effectively excluding the other responses corresponding to other resources embedded in the resource of the request. In an exemplary embodiment, the responses corresponding to other resources embedded in the resource of the request represent approximately 90 percent of the responses from the location. In this exemplary embodiment, the service provider system 102 removes these responses corresponding to other resources embedded in the resource of the request leaving only approximately 10 percent of the responses from the location to be cataloged by the service provider system 102.

Referring back to FIG. 1A, the service provider system 102 sends the one or more responses received from the location to the subscriber devices 104.1 through 104.*n* in the downstream direction. Thereafter, the subscriber devices 104.1 through 104.*n* render the requested resource using the one or more responses.

Exemplary Cable Communication System

Figure 1B:
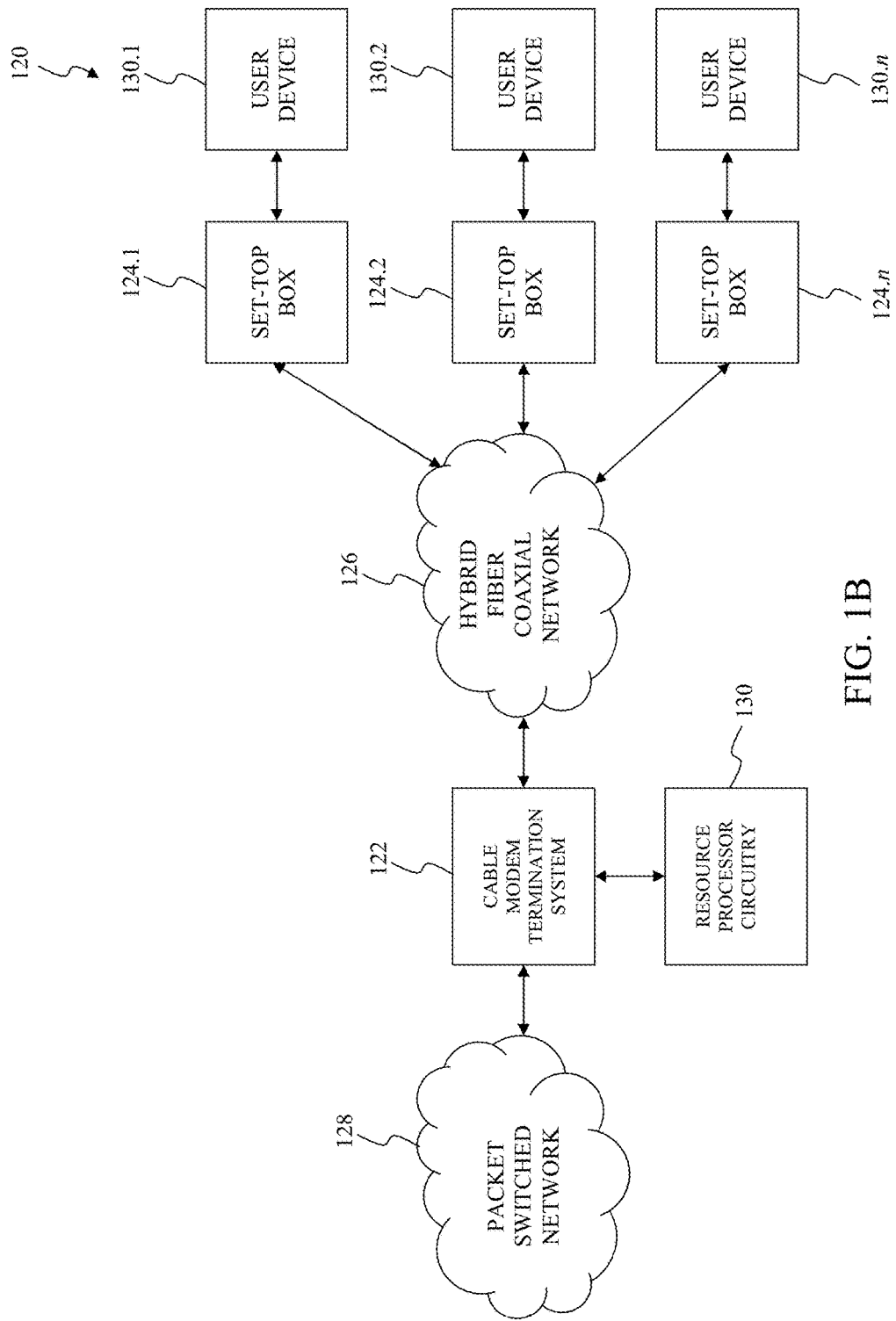
FIG. 1B illustrates a block diagram of an exemplary cable communication system according to an embodiment of the present disclosure.

FIG. 1B illustrates a block diagram of an exemplary cable communication system according to an embodiment of the present disclosure. A cable communications system 120 facilitates bi-directional communication of information, such as video, audio, and/or data to provide some examples, between a cable modem termination system (CMTS) 122 and set-top boxes 124.1 through 124.*n* via a communications network 126, such as a hybrid fiber coaxial (HFC) cable network to provide an example. In an exemplary embodiment, the CMTS 122 and the set-top boxes 124.1 through 124.*n* communicate with each other using a bi-directional transfer of packet-based traffic, such as Internet Protocol (IP) traffic to provide an example. The cable communications system 120 can represent an exemplary embodiment of the communications system 100.

The CMTS 122 manages the upstream direction and the downstream direction transfer of information to and/or from the set-top boxes 124.1 through 124.*n* in a substantially similar manner as the service provider system 102 as discussed in FIG. 1A. During operation in the upstream direction, one or more of the user devices 130.1 through 130.*n* provide the request to access the resource to one or more corresponding set-top boxes from among set-top boxes 124.1 through 124.*n*. Each of the user devices 130.1 through 130.*n* can represent an exemplary embodiments of one or more of the subscriber devices 104.1 through 104.*n* as discussed in FIG. 1A. As such, the user devices 130.1 through 130.*n* can execute the software application to provide the request. For example, the string of characters is entered into the software application to identify the resource or the software application executing on the user devices 130.1 through 130.*n* can generate the string of characters to identify the resource on behalf of the user devices 130.1 through 130.*n* as discussed in FIG. 1A.

The set-top boxes 124.1 through 124.*n* provide the request from the user devices 130.1 through 130.*n* onto the CMTS 122 via a communications network, such as a hybrid fiber coaxial (HFC) network 126 to provide an example, in the upstream direction. The HFC network 126 provides a point-to-multipoint topology for the high speed, reliable, and secure transport of information between the CMTS 122 and the set-top boxes 104.1 through 104.*n*. As will be appreciated by those skilled in the relevant art(s), the HFC network 126 may include coaxial cable, fiber optic cable, or a combination of coaxial cable and fiber optic cable linked via one or more fiber nodes, and may include frequency translation devices in support of a frequency stacking architecture, and may even include wireless links without departing from the spirit and scope of the present disclosure.

Thereafter, the CMTS 122 passes the request onto the location of the resource, such as a host or a server to provide some examples, within a packet switched network 128 in the upstream direction. Generally, the packet switched network 128 represents a communication network that groups data into specialized blocks, often referred to as packets. For example, the packet switched network 128 can represent a global system of interconnected computer networks that use the Internet protocol suite (TCP/IP), namely the Internet.

In response to the request, the CMTS 122 receives one or more responses from the location of the resource in the downstream direction. As illustrated in FIG. 1B, resource processor circuitry 130 can monitor the one or more responses to determine information about the resource as discussed in FIG. 1A. In an exemplary embodiment, the resource processor circuitry 130 represents a parallel processing path for the CMTS 122. The resource processor circuitry 130 can be implemented external to the CMTS 122, as shown in FIG. 1A, or internal, namely, as part of, to the CMTS 122. Thereafter, the resource processor circuitry 130 can parse the response corresponding to the resource of the request from other responses corresponding to other resources embedded in the resource of the request as discussed in FIG. 1A. Thereafter, the resource processor circuitry 130 can catalog the response corresponding to the resource of the request to approximate the browsing histories of the user devices 130.1 through 130.*n* while effectively excluding the other responses corresponding to other resources embedded in the resource of the request as discussed in FIG. 1A.

Referring back to FIG. 1A, the CMTS 122 sends the one or more responses received from the location of the resource to the set-top boxes 124.1 through 124.*n* via the HFC network 126 which are then forwarded onto the user devices 130.1 through 130.*n* in the downstream direction. Thereafter, the user devices 130.1 through 130.*n* render the requested resource using the one or more responses.

Exemplary Resource Processor Circuitry within the Point-to-Multipoint Communication System FIG. 2 illustrates a block diagram of exemplary resource processor circuitry within the point-to-multipoint communication system according to an embodiment of the present disclosure. As illustrated in FIG. 2, resource processor circuitry 200 performs a pattern matching routine to parse the response corresponding to the resource of the request from the responses corresponding to other resources embedded in the resource of the request. For example, the resource processor circuitry 200 parses the responses corresponding to the UIURL from the responses corresponding to the noise-URLs embedded in the response. For the purposes of this discussion, the term "circuitry" shall be understood to include an analog circuit, a digital circuit, state machine logic, other structural electronic hardware, or a combination thereof. The term "processor circuitry" shall be understood to be one or more: circuit(s), processor(s), or a combination thereof. A processor can include a microprocessor, a digital signal processor (DSP), or other hardware processor. The processor can be "hard-coded" with instructions to perform corresponding function(s) according to embodiments described herein. Alternatively, the processor can access an internal and/or external memory to retrieve instructions stored in the memory, which when executed by the processor, perform the corresponding function(s) associated with the processor. As illustrated in FIG. 2, the resource processor circuitry 200 includes monitoring circuitry 202, pattern matching circuitry 204, a pattern storage 206, cataloging circuitry 208, and a browsing history storage 210. In an exemplary embodiment, the resource processor circuitry 200 can be implemented as part of a service provider system, such as the service provider system 102, external to a CMTS, such as the CMTS 122, or internal to the CMTS to provide some examples.

The monitoring circuitry 202 monitors one or more responses 250, such as the multiple responses as discussed above, which are provided in response to a request to access a resource within the point-to-multipoint communication system. The monitoring circuitry 202 monitors the one or more responses 250 at a packet level, such as Transmission Control Protocol/Internet Protocol (TCP/IP) packet level to provide an example, and thereafter aggregates this packet level data to network level data, such as HTTP level data to provide an example. In an exemplary embodiment, the network level data includes a status code and/or a reason message, such as the "statuscode" field to provide an example, and one or more response header fields, such as the "host" field, the "content-type" field, and/or the "resource" field to provide some examples. Thereafter, the monitoring circuitry 202 provides the network level data as response data 252 to the pattern matching circuitry 204.

The pattern matching circuitry 204 performs the pattern matching routine on the response data 252 to parse the response corresponding to the resource of the request from the responses corresponding to other resources embedded in the resource of the request. Generally, a pattern represents a near consistent and almost recurring characteristic or trait of the response data 252 that helps identifies whether the response data 252 corresponds to the resource of the request or to other resources embedded in the resource of the request. As such, the pattern matching routine can include a string pattern matching and/or numerical pattern matching.

As illustrated in FIG. 2, the string pattern matching compares the response data 252 with stored resource data 254 that corresponds to the resource of the request. For example, the string pattern matching compares the "host" field, the "content-type" field, and/or the "resource" field of the response data 252 with a "host" field, a "content-type" field, and/or a "resource" field, respectively, that corresponds to the resource of the request from among the stored resource data 254. The stored resource data 254 can be characterized as being exclusionary data or inclusionary data. The exclusionary data represents data that corresponds to the other resources embedded in the resource of the request while the inclusionary data represents data that corresponds to the resource of the request.

When one or more fields of the response data 252 match one or more fields of the stored inclusionary resource data 254 that corresponds to the resource of the request, the string pattern matching determines that the response corresponds to the resource of the request. As such, the string pattern matching passes the response data 252 onto the cataloging circuitry 208 as resource data 256. However, when the one or more fields of the response data 252 do not match the one or more fields of the stored inclusionary resource data 254 that corresponds to the resource of the request, the string pattern matching determines that the response corresponds to the other resources embedded in the resource of the request. As such, the string pattern matching does not pass the response data 252 onto the cataloging circuitry 208 as resource data 256. Rather, in this situation, the response data 252 is simply disregarded by the string pattern matching.

Otherwise, when one or more fields of the response data 252 does not match one or more fields of the stored exclusionary resource data 254 that corresponds to the resource of the request, the string pattern matching determines that the response corresponds to the resource of the request. As such, the string pattern matching passes the response data 252 onto the cataloging circuitry 208 as resource data 256. However, when the one or more fields of the response data 252 match the one or more fields of the stored exclusionary resource data 254 that corresponds to the resource of the request, the string pattern matching determines that the response corresponds to the other resources embedded in the resource of the request. As such, the string pattern matching does not pass the response data 252 onto the cataloging circuitry 208 as resource data 256. Rather, in this situation, the response data 252 is simply disregarded by the string pattern matching.

As illustrated in FIG. 2, the numerical pattern matching compares one or more numerical attributes of the response data 252 with one or more numerical attributes of the stored resource data 254 that corresponds to the resource of the request. For example, the one or more numerical attributes can include a number of bytes transferred to and/or from the resource, a duration of time spent accessing the resource, time of day the resource was accessed, a frequency the resource was accessed, and/or any other well-known numerical attribute of the resource that will be apparent to those skilled in the relevant art(s) without departing from the spirit and scope of the present disclosure. The numerical pattern matching can determine the one or more numerical attributes of the response data 252 by examining the response data 252 or in combination other response data 252 that was previously received.

When one or more numerical attributes of the response data 252 match, or are within a tolerance threshold of, one or more numerical attributes of the stored inclusionary resource data 254 that corresponds to the resource of the request, the numerical pattern matching determines that the response corresponds to the resource of the request. As such, the numerical pattern matching passes the response data 252 onto the cataloging circuitry 208 as resource data 256. However, when the one or more numerical attributes of the response data 252 do not match, or are not within the tolerance threshold of, the one or more numerical attributes of the stored inclusionary resource data 254 that corresponds to the resource of the request, the numerical pattern matching determines that the response corresponds to the other resources embedded in the resource of the request. As such, the numerical pattern matching does not pass the response data 252 onto the cataloging circuitry 208 as resource data 256. Rather, in this situation, the response data 252 is simply disregarded by the numerical pattern matching.

Otherwise, when one or more numerical attributes of the response data 252 does not match, or are not within the tolerance threshold of, one or more numerical attributes of the stored exclusionary resource data 254 that corresponds to the resource of the request, the numerical pattern matching determines that the response corresponds to the resource of the request. As such, the numerical pattern matching passes the response data 252 onto the cataloging circuitry 208 as resource data 256. However, when the one or more numerical attributes of the response data 252 match, or are within the tolerance threshold of, the one or more numerical attributes of the stored exclusionary resource data 254 that corresponds to the resource of the request, the numerical pattern matching determines that the response corresponds to the other resources embedded in the resource of the request. As such, the numerical pattern matching does not pass the response data 252 onto the cataloging circuitry 208 as resource data 256. Rather, in this situation, the response data 252 is simply disregarded by the numerical pattern matching.

The pattern storage 206 stores the stored resource data 254 and/or the one or more numerical attributes of the stored resource data 254 that is used by the pattern matching circuitry 204 to perform the pattern matching routine. The stored resource data 254 and/or the one or more numerical attributes of the stored resource data 254 can be stored as one or more listings, one or more tables, one or more files, one or more databases, and/or any other well-known storage type that will be apparent to those skilled in the relevant art(s) without departing from the spirit and scope of the present disclosure. The pattern storage 206 can include non-transitory machine-readable mediums such as read only memory (ROM), random access memory (RAM), magnetic disk storage media, optical storage media, and/or flash memory devices to provide some examples. As discussed above, the stored resource data 254 can be characterized as being exclusionary data or inclusionary data. In an exemplary embodiment, the stored inclusionary resource data 254 can include a "statuscode" field that corresponds to the resource of the request. For example, the "statuscode" field of the stored resource data 254 can include one or more class 2 status codes indicating the request was received, understood, accepted, and processed successfully and/or one or more class 3 status codes indicating that additional action is needed to complete the request. In another exemplary embodiment, the stored exclusionary resource data 254 can include a "host" field, a "content-type" field, and/or a "resource" field that corresponds to the other resources embedded in the resource of the request. For example, the "host" field of the stored resource data 254 can include a listing of locations that are known to include the other resources embedded in the resource of the request. As another example, the "content-type" field can include a listing of media types, such as application, audio, example, image, message, model, multipart, text, and/or video to provide some examples, that correspond to the other resources embedded in the resource of the request. As a further example, the "resource" field can include one or more logical paths that are known to correspond to the other resources embedded in the resource of the request.

The cataloging circuitry 208 determines one or more corresponding user devices, such as one or more of the subscriber devices 104.1 through 104.n to provide an example, that requested the resource from the resource data 256. Thereafter, the cataloging circuitry 208 catalogs a browsing history from among browsing histories 258 corresponding to the one or more corresponding user devices to include data corresponding to the requested resource. This data can include the resource and/or data associated with the resource, such as a title of the resource, a frequency of accessing the resource, a duration that the resource was accessed, a number of bytes transferred to and/or from the resource, a ranking of the resource compared to other resources, and a time of visit to the resource to provide some examples.

The browsing history storage 210 stores the browsing histories 258. The browsing histories 258 can be stored as one or more listings, one or more tables, one or more files, one or more databases, and/or any other well-known storage type that will be apparent to those skilled in the relevant art(s) without departing from the spirit and scope of the present disclosure. The browsing history storage 210 can include non-transitory machine-readable mediums such as read only memory (ROM), random access memory (RAM), magnetic disk storage media, optical storage media, and/or flash memory devices to provide some examples.

Exemplary Pattern Matching Routine

FIG. 3 is a flowchart of exemplary operational steps of the pattern matching routine that can be used by the exemplary resource processor circuitry according to an embodiment of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 300 of a pattern matching routine that can be used by a processor, such as the resource processor circuitry 200 to provide an example, in parsing responses corresponding to a resource from other responses corresponding to other resources embedded in the resource. It should be noted that the various steps of the operational control flow 300 need not be performed in the order as described. Rather, those skilled in the relevant art(s) will recognize that other others are possible without departing from the spirit and scope of the present disclosure.

At step 302, the operational flow control 300 performs a "host" field cleanup of a response to a request to access a resource. In some situations, the "host" field of the response can be populated with an illegal "host" value, such as an empty "host" value, a numeric "host" value, and/or a non-English "host" value to provide some examples. In these situations, the operational flow control 300 excludes the response from further processing as not corresponding to the requested resource.

At step 304, the operational flow control 300 determines a protocol of the response. The response can include different fields depending on the protocol used to access the resource. For example, response can include the "statuscode" field, the "host" field, the "content-type" field, and/or the "resource" field when HTTP is used to access the resource. However, the "statuscode" field, the "content-type" field, and the "resource" field are not present when HTTPS is used to access the resource. In an exemplary embodiment, the first part of the URL within the "host" field can be used to indicate the protocol used to access the resource. The operational flow control 300 proceeds to step 306 when HTTP is used to access the resource. Otherwise, the operational flow control 300 proceeds to step 318 when HTTPS is used to access the resource.

At step 306, the operational flow control 300 performs a "statuscode" field filtering of the response. For example, the "statuscode" field of the response can include one or more class 2 status codes indicating the request was received, understood, accepted, and processed successfully and/or one or more class 3 status codes indicating that additional action is needed to complete the request. In this example, the operational flow control 300 proceeds to step 308 when the value of the "statuscode" field is the one or more class 2 status codes or the one or more class 3 status codes indicating that the response corresponds to the requested resource. Otherwise the operational flow control 300 excludes the response from further processing as not corresponding to the requested resource when the value of the "statuscode" field is one or more class 1 status codes, one or more class 4 status codes, or one or more class 5 status codes.

At step 308, the operational flow control 300 performs a "content-type" field Regular Expression (RegEx) filtering of the response. The operational flow control 300 searches the value of the "content-type" field for media types that are previously known not to correspond with the requested resource. This "content-type" field for media types that are previously known not to correspond with the requested resource can include, but is not limited to, ["[cC]ss", "[jJ]ava", "[fF]on[ts]+", "[jJ]av", "[jJ]s$", "[xX]ml", "flv", "[aA]pplication/[xX]-shock", "[aA]pplication/[xX]-[sS]ophos", and/or "[xX]cp/[dD]isc-[rR]es"] to provide some examples. In an exemplary embodiment, the operational flow control 300 searches for one or more category/sub-category patterns in the "content-type" field, such as "text/ html" to provide an example, that are previously known not to correspond with the requested resource. In this exemplary embodiment, the operational flow control 300 excludes the response from further processing as corresponding to the other resources embedded in the resource of the request when the value of the "content-type" field matches the one or more category/sub-category patterns.

At step 310, the operational flow control 300 performs a "host" field filtering RegEx exclusion of the response. The operational flow control 300 searches the value of the "host" field for locations that are previously known not to correspond with the requested resource. This value of the "host" field for locations that are previously known not to correspond with the requested resource can include, but is not limited to, "trendmicro\\.", "rubicon", "bh\\.local", "\\.api$", "localhost\\.localdomain", "cdn\\.", "openx", "\\.cdn", "\\.local$", and/or "[0-9]+\\.localdomain"] to provide some examples. In an exemplary embodiment, the operational flow control 300 searches for one or more location patterns in the "host" field that are previously known not to correspond with the requested resource. For example, the "host" field can be represented as: www.hostname.com or www.noisehostname.com. In this example, the operational flow control 300 determines whether the "host" field, in this case, www.hostname.com or www.noisehostname.com, matches the one or more location patterns in the "host" field that are previously known not to correspond with the requested resource. In this exemplary embodiment, the operational flow control 300 excludes the response from further processing as corresponding to the other resources embedded in the resource of the request when the value of the "host" field matches the one or more location patterns.

At step 312, the operational flow control 300 performs a "host" field prefix RegEx exclusion of the response. In an exemplary embodiment, the operational flow control 300 separates a prefix of the "host" field from the "host" field. Thereafter, the operational flow control 300 searches for one or more prefix patterns in the prefix of the "host" field that are previously known not to correspond with the requested resource. For example, the "host" field can be represented as: www.prefixhostname.com. In this example, the operational flow control 300 determines whether the prefix of the "host" field, in this case, prefix, matches the one or more prefix patterns in the prefix of the "host" field that are previously known not to correspond with the requested resource. In this exemplary embodiment, the operational flow control 300 excludes the response from further processing as corresponding to the other resources embedded in the resource of the request when the value of the "host" field matches the one or more prefix patterns in the prefix of the "host" field.

At step 314, the operational flow control 300 performs a "host" field exclusion of the response. The operational flow control 300 compares the "host" field of the response with names of locations that are previously known not to correspond with the requested resource. The names of the locations can be part of an exclusion list of locations that are previously known not to correspond with the requested resource. Thereafter, the operational flow control 300 excludes the response from further processing as corresponding to the other resources embedded in the resource of the request when the value of the "host" field includes the names of locations that are previously known not to correspond with the requested resource.

At step 316, the operational flow control 300 performs a "resource" field RegEx exclusion of the response. In an exemplary embodiment, the operational flow control 300 searches the value of the "resource" field, for example, directory/subdirectory, for directories and/or subdirectories that are previously known not to correspond with the requested resource. In this exemplary embodiment, the operational flow control 300 excludes the response from further processing as corresponding to the other resources embedded in the resource of the request when the value of the "resource" field matches the directories and/or subdirectories that are previously known not to correspond with the requested resource.

At step 318, the operational flow control 300 performs a "host" field filtering RegEx exclusion of the response. The operational flow control 300 performs step 318 in a substantially similar manner as step 310.

At step 320, the operational flow control 300 performs a "host" field prefix RegEx exclusion of the response. The operational flow control 300 performs step 320 in a substantially similar manner as step 312.

At step 322, the operational flow control 300 performs a "host" field exclusion of the response. The operational flow control 300 performs step 322 in a substantially similar manner as step 314.

CONCLUSION

Although the embodiments of the disclosure described herein refer specifically, and by way of example, to cable modem systems, including cable modem termination systems and set-top boxes it will be readily apparent to those skilled in the relevant art(s) that the disclosure is equally applicable to satellite systems, optical communication systems, telephone wire systems, home network systems, and/or any combination thereof. It will be readily apparent to those skilled in the relevant art(s) that the disclosure is applicable to any point-to-multipoint system.

The Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The Detailed Description is not meant to be limiting. Rather, the scope of the disclosure is defined only in accordance with the following claims and their equivalents. It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the following claims and their equivalents in any way.

The exemplary embodiments described within the disclosure have been provided for illustrative purposes, and are not intend to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing circuitry). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software, routines, instructions can be described herein as performing certain actions. However, it should be appreciated that such descriptions are merely for convenience and that such actions in fact result from computing devices, processors, controllers, or other devices executing the firmware, software, routines, instructions, etc.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. Resource processor circuitry within a service provider system of a point-to-multipoint communication system for approximating a browsing history of a subscriber device of the point-to-multipoint communication system, the resource processor circuitry comprising:
    a memory that stores one or more known response header fields associated with one or more background-Uniform Resource Locators (URLs);
    pattern matching circuitry configured to:
        receive a response from a location of the point-to-multipoint communication system identified in a request to access a resource from the subscriber device,
        compare one or more response header fields of the response and the one or more known response header fields to determine whether the response corresponds to a User-Intended/Initiated URL or a background-URL, the response corresponding to the User-Intended/Initiated URL when the one or more response header fields of the response do not match the one or more known response header fields and corresponding to the background-URL when the one or more response header fields of the response match the one or more known response header fields; and
    cataloging circuitry configured to:
        catalog the browsing history to include data corresponding to the response when the response corresponds to the User-Intended/Initiated URL, and
        exclude the data corresponding to the response from being included within the browsing history when the response corresponds to the background-URL.

2. The resource processor circuitry of claim 1, further comprising:
    monitoring circuitry configured to:
        monitor the response at a packet level to provide packet level data, and
        aggregate the packet level data to network level data having the one or more response header fields of the response.

3. The resource processor circuitry of claim 1, wherein the one or more response header fields of the response comprise:
    a "statuscode" field,
    a "host" field,
    a "content-type" field, or
    a "resource" field.

4. The resource processor circuitry of claim 1, wherein the resource comprises:
    a webpage.

5. The resource processor circuitry of claim 1, wherein the one or more response header fields of the response comprise:
    a "statuscode" field,
    a "host" field,
    a "content-type" field, or
    a "resource" field, and
    wherein the one or more known response header fields comprise:
        one or more class status codes corresponding to the "statuscode" field, the one or more class status codes being previously known not to correspond with the resource;
        one or more locations corresponding to the "host" field, the one or more locations being previously known not to correspond with the resource;
        one or more category/sub-category patterns corresponding to the "content-type" field, the one or more category/sub-category patterns being previously known not to correspond with the resource; or
        one or more directories and/or subdirectories corresponding to the "resource" field, the one or more directories and/or subdirectories being previously known not to correspond with the resource.

6. A method for approximating a browsing history of a subscriber device of a point-to-multipoint communication system, the method comprising:
    storing, by a service provider system of the point-to-multipoint communication system, one or more known response header fields associated with one or more background-Uniform Resource Locators (URLs);
    receiving, by the service provider system, a response from a location of the point-to-multipoint communication system identified in a request to access a resource from the subscriber device,
    comparing, by the service provider system, one or more response header fields of the response and the one or more known response header fields to determine whether the response corresponds to a User-Intended/Initiated URL or a background-URL, the response corresponding to the User-Intended/Initiated URL when the one or more response header fields of the response do not match the one or more known response header fields and corresponding to the background- URL when the one or more response header fields of the response match the one or more known response header fields;

cataloging, by the service provider system, the browsing history to include data corresponding to the response when the response corresponds to the User-Intended/Initiated URL; and excluding, by the service provider system, the data corresponding to the response from being included within the browsing history when the response corresponds to the background-URL.

7. The method of claim 6, further comprising:

monitoring the response at a packet level to provide packet level data; and aggregating the packet level data to network level data having the one or more response header fields of the response.

8. The method of claim 6, wherein the one or more response header fields of the response comprise:

a "statuscode" field, a "host" field, a "content-type" field, or a "resource" field.

9. The method of claim 6, wherein the resource comprises:

a webpage.

10. The method of claim 6, wherein the comparing comprises:

searching for the one or more known response header fields within the one or more response header fields of the response in accordance with a string pattern matching routine or a numerical pattern matching routine;

identifying the response as corresponding to the background-URL when the one or more known response header fields are located within the one or more response header fields of the response; and identifying the response as corresponding to the User-Intended/Initiated URL when the one or more known response header fields are not located within the one or more response header fields of the response.

11. The method of claim 6, wherein the one or more response header fields of the response comprise:

a "statuscode" field, a "host" field, a "content-type" field, or a "resource" field, and wherein the one or more known response header fields comprise:

one or more class status codes corresponding to the "statuscode" field, the one or more class status codes being previously known not to correspond with the resource;

one or more locations corresponding to the "host" field, the one or more locations being previously known not to correspond with the resource;

one or more category/sub-category patterns corresponding to the "content-type" field, the one or more category/sub-category patterns being previously known not to correspond with the resource; or one or more directories and/or subdirectories corresponding to the "resource" field, the one or more directories and/or subdirectories being previously known not to correspond with the resource.

12. A point-to-multipoint communication system for approximating a browsing history of a subscriber device of the point-to-multipoint communication system, the point-to-multipoint communication system comprising:

a service provider system, within the point-to-multipoint communication system, configured to receive a request to access a resource from the subscriber device and a response received from a location identified in the request, the service provider system comprising:

resource processor circuitry configured to:

compare one or more response header fields of the response and one or more known response header fields associated with one or more background-Uniform Resource Locators (URLs) to determine whether the response corresponds to a User-Intended/Initiated URL or a background-URL, the response corresponding to the User-Intended/Initiated URL when the one or more response header fields of the response do not match the one or more known response header fields and corresponding to the background-URL when the one or more response header fields of the response match the one or more known response header fields, catalog the browsing history to include data corresponding to the response when the response corresponds to the User-Intended/Initiated URL, and exclude the data corresponding to the response from being included within the browsing history when the response corresponds to the background-URL.

13. The point-to-multipoint communication system of claim 12, wherein the service provider system further comprises:

pattern storage configured to store the one or more known response header fields.

14. The point-to-multipoint communication system of claim 12, wherein the one or more response header fields of the response comprise:

a "statuscode" field, a "host" field, a "content-type" field, or a "resource" field, and wherein the one or more known response header fields comprise:

one or more class status codes corresponding to the "statuscode" field, the one or more class status codes being previously known not to correspond with the resource;

one or more locations corresponding to the "host" field, the one or more locations being previously known not to correspond with the resource;

one or more category/sub-category patterns corresponding to the "content-type" field, the one or more category/sub-category patterns being previously known not to correspond with the resource; or one or more directories and/or subdirectories corresponding to the "resource" field, the one or more directories and/or subdirectories being previously known not to correspond with the resource.

15. The resource processor circuitry of claim 1, wherein the data corresponding to the response comprises:

a title of the resource;

a frequency of accessing the resource;

a duration the resource was accessed;

a number of bytes transferred to and/or from the resource;

a ranking of the resource compared to other resources; or a time of visit to the resource.

16. The resource processor circuitry of claim 1, wherein the pattern matching circuitry is configured to compare the one or more response header fields of the response and the one or more known response header fields in accordance with a string pattern matching routine or a numerical pattern matching routine.

17. The resource processor circuitry of claim 1, wherein the pattern matching circuitry is configured to disregard the data corresponding to the response when the response corresponds to the background-URL.

18. The resource processor circuitry of claim 1, wherein the pattern matching circuitry is further configured to pass the response onto the cataloging circuitry when the response corresponds to the User-Intended/Initiated URL and to not pass the response onto the cataloging circuitry when the response corresponds to the background-URL.

19. The method of claim 6, wherein the data corresponding to the response comprises:
- a title of the resource;
- a frequency of accessing the resource;
- a duration the resource was accessed;
- a number of bytes transferred to and/or from the resource;
- a ranking of the resource compared to other resources; or
- a time of visit to the resource.

20. The point-to-multipoint communication system of claim 12, wherein the data corresponding to the response comprises:
- a title of the resource;
- a frequency of accessing the resource;
- a duration the resource was accessed;
- a number of bytes transferred to and/or from the resource;
- a ranking of the resource compared to other resources; or
- a time of visit to the resource.

* * * * *